United States Patent
Kim et al.

(10) Patent No.: US 6,934,072 B1
(45) Date of Patent: Aug. 23, 2005

(54) VARIABLE FOCAL LENGTH LENS COMPRISING MICROMIRRORS WITH TWO DEGREES OF FREEDOM ROTATION AND ONE DEGREE OF FREEDOM TRANSLATION

(75) Inventors: Tae Hyeon Kim, Taejeon (KR); Sang Hyune Baek, Suwon (KR)

(73) Assignees: Angstrom Inc., Suwon (KR); Stereo Display Inc., Fullerton, CA (US)

( * ) Notice: Subject to any disclaimer, the term of this patent is extended or adjusted under 35 U.S.C. 154(b) by 0 days.

(21) Appl. No.: 10/855,287

(22) Filed: May 27, 2004

(51) Int. Cl.[7] ........................ G02B 26/00; G02B 26/08
(52) U.S. Cl. .................... 359/291; 359/290; 359/295; 359/298; 359/225; 359/226
(58) Field of Search ............................. 359/290, 291, 359/295, 298, 225, 226, 846, 625, 626; 396/89; 40/582; 372/22

(56) References Cited

U.S. PATENT DOCUMENTS 2,002,376 A * 5/1935 Mannheimer ................. 40/582
6,111,900 A * 8/2000 Suzudo ......................... 372/22
2002/0102102 A1 * 8/2002 Watanabe et al. ............. 396/89

* cited by examiner

Primary Examiner—Georgia Epps
Assistant Examiner—Jack Dinh
(74) Attorney, Agent, or Firm—Park & Sutton LLP; John K. Park

(57) ABSTRACT

A micromirror array lens consists of many micromirrors with two degrees of freedom rotation and one degree of freedom translation and actuating components. As a reflective variable focal length lens, the array of micromirrors makes all lights scattered from one point of an object have the same periodic phase and converge at one point of image plane. As operating methods for the lens, the actuating components control the positions of micromirrors electrostatically and/or electromagnetically. The optical efficiency of the micromirror array lens is increased by locating a mechanical structure upholding micromirrors and the actuating components under micromirrors. Semiconductor microelectronics technologies can remove the loss in effective reflective area due to electrode pads and wires. The lens can correct aberration by controlling each micromirror independently. Independent control of each micromirror is possible by known semiconductor microelectronics technologies. The micromirror array can also form a lens with desired arbitrary shape and/or size.

33 Claims, 5 Drawing Sheets

VARIABLE FOCAL LENGTH LENS COMPRISING MICROMIRRORS WITH TWO DEGREES OF FREEDOM ROTATION AND ONE DEGREE OF FREEDOM TRANSLATION

BACKGROUND OF THE INVENTION

The present invention relates to a variable focal length lens comprising micromirrors with two degrees of freedom rotation and one degree of freedom translation.

A most widely used conventional variable focal length system is the one using two refractive lenses. It has complex driving mechanisms to control the relative positions of refractive lenses and a slow response time. Alternatively, variable focal length lenses have been made. Variable focal length lenses can be made by changing the shape of the lens, as is found in the human eye; this method has been used in lenses made with isotropic liquids. Other lenses have been made of electrically variable refractive index media to create either a conventional lens or a gradient index lens by means of a voltage gradient. The electrically variable refractive index allows the focal length of the lenses to be voltage controlled. Among them, the most advanced variable focal length lens is a liquid crystal variable focal length lens, which has a complex mechanism to control the focal length. Its focal length is changed by modulating the refractive index. Unfortunately, it has a slow response time typically on the order of hundreds of milliseconds. Even though the fastest response liquid crystal lens has the response time of tens of milliseconds, it has small focal length variation and low focusing efficiency.

To solve the disadvantages of the conventional focal length lens, a fast-response micromirror array lens was proposed. The details of the fast-response micromirror array lens are described in J. Boyd and G. Cho, 2003, "Fast-response Variable Focusing Micromirror Array Lens," *Proceeding of SPIE* Vol. 5055: 278–286. The paper is incorporated by reference into this disclosure as if fully set forth herein. The micromirror array lens mainly consists of micromirrors and actuating components, and uses a much simpler mechanism to control the focusing system than a liquid crystal variable focal length lens. The focal length of the micromirror array lens is varied with the displacement of each micromirror. But, the paper only describes basic idea related to design and control. This invention improves the design and control of the micromirror array lens. This invention extends advantages and applications of the lens.

SUMMARY OF THE INVENTION

The present invention contrives to solve the disadvantages of the conventional variable focal length lens.

The objective of the invention is to improve the design and control of the micromirror array lens. The invention extends advantages and applications of the lens.

The invention works as a variable focal length lens, and consists of many micromirrors to reflect the light and actuating components to control positions of the micromirrors. Each micromirror has the same function as a mirror. Therefore, the reflective surface of the micromirror is made of metal, metal compound, multi-layered dielectric material, or other materials with high reflectivity. Many known microfabrication processes can make the surface of the micromirror to have high reflectivity. By making all light scattered from one point of an object have the same periodical phase and converge at one point of image plane, the micromirror array works as a reflective variable focal length lens. In order to do this, the micromirrors are electrostatically and/or electromagnetically controlled to have desired positions by actuating components. The focal length of the lens is changed by controlling both translation and rotation of each micromirror.

The micromirror array lens can be formed by a polar array of the micromirrors. For the polar array, each micromirror has a fan shape to increase an effective reflective area, so that the optical efficiency increases. The optical efficiency of the micromirror array lens can be improved by locating a mechanical structure upholding micromirrors and the actuating components under micromirrors to increase an effective reflective area. Electric circuits to operate the micromirrors can be replaced with known semiconductor microelectronics technologies such as MOS and CMOS. Applying the microelectronics circuits under micromirror array, the effective reflective area can be increased by removing necessary area for electrode pads and wires.

The micromirrors are arranged to form one or more concentric circles to form the axisymmetric lens and the micromirrors on the same concentric circle can be controlled by the same electrodes with concentric circle shape or independently controlled by known semiconductor microelectronics technologies such as MOS or CMOS.

It is desired that each of the micromirrors has a curvature because the ideal shape of a conventional reflective lens has a curvature. If the size of the flat micromirror is small enough, the aberration of the lens comprising flat micromirrors is also small enough. In this case, the micromirror does not need a curvature.

The lens can correct aberration, which is caused by optical effects due to the medium between the object and its image or is caused by defects of a lens system that cause its image to deviate from the rules of paraxial imagery, by controlling each micromirror independently. Independent control of each micromirror is also possible by replacing electric circuits required for control with known CMOS or CMOS technologies and fabricating the circuits underneath the micromirrors using known microfabrication methods.

The array comprising micromirrors with two degree of freedom rotations and one degree of freedom translation which are controlled independently can make a lens with arbitrary shape and/or size. Incident lights can be modulated arbitrarily by forming arbitrary shape and/or size of a lens. To do this, it is required that incident lights are deflected to arbitrary directions by controls of two degree of freedom rotations and one degree of freedom translation. Independent translation of each micromirror is also required to satisfy the phase condition.

The advantages of the present invention are: (1) the micromirror array lens has a very fast response time because each micromirror has a tiny mass; (2) the lens has a large focal length variation because a large numerical aperture variation can be achieved by increasing the maximum rotational angle of the micromirror; (3) the lens has a high optical focusing efficiency; (4) the lens can have a large size aperture without losing optical performance. Because the micromirror array lens consists of discrete micromirrors, the increase in the lens size does not cause the increase in aberration caused by shape error of a lens; (5) the lens has a low cost because of the advantages of its mass productivity; (6) the lens can correct aberration; (7) the lens makes the focusing system much simple; (8) the lens can have arbitrary shape and/or size.

Although the present invention is briefly summarized, the full understanding of the invention can be obtained by the following drawings, detailed description, and appended claims.

DESCRIPTION OF THE FIGURES

These and other features, aspects and advantages of the present invention will become better understood with references to the accompanying drawings, wherein.

DETAILED DESCRIPTION OF THE INVENTION

Figure 1:
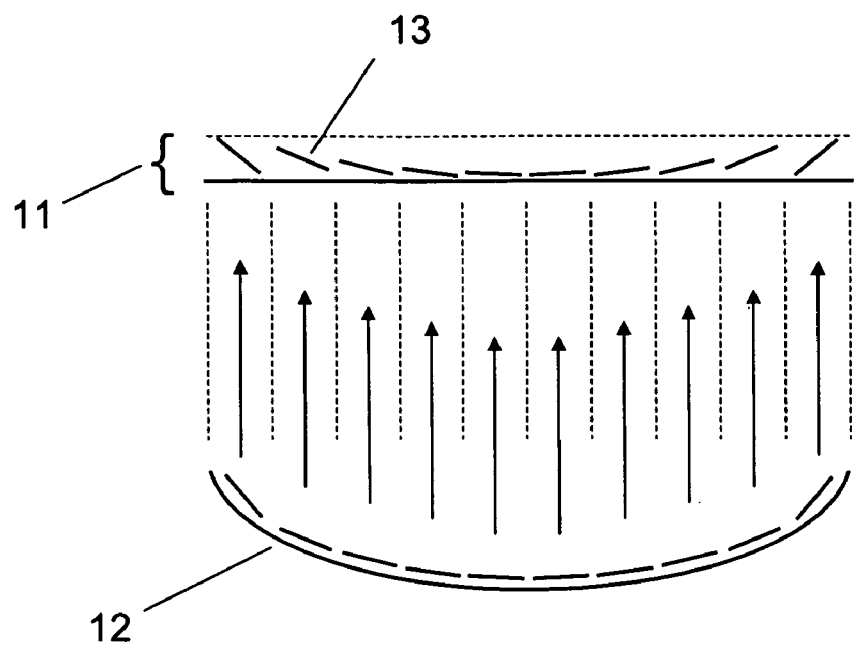
FIG. 1 is a schematic diagram showing the cut-away side view of a micromirror array lens.

FIG. 1 illustrates the principle of the micromirror array lens 11. There are two conditions to make a perfect lens. The first is the converging condition that all lights scattered by one point of an object should converge into one point of the image plane. The second is the same phase condition that all converging light should have the same phase at the image plane. To satisfy the perfect lens conditions, the surface shape of conventional reflective lens 12 is formed to have all lights scattered by one point of an objective to be converged into one point of the image plane and have the optical path length of all converging light to be same.

A micromirror array arranged in flat plane can satisfy two conditions to be a lens. Each of the micromirrors 13 rotates to converge the scattered light. Because all micromirrors 13 of the micromirror array lens 11 are arranged in a flat plane as shown in FIG. 1, the optical path length of lights converged by rotation of the micromirrors is different. Even though the optical path length of converging light is different, the same phase condition can be satisfied by adjusting the phase because the phase of light is periodic.

Figure 2:
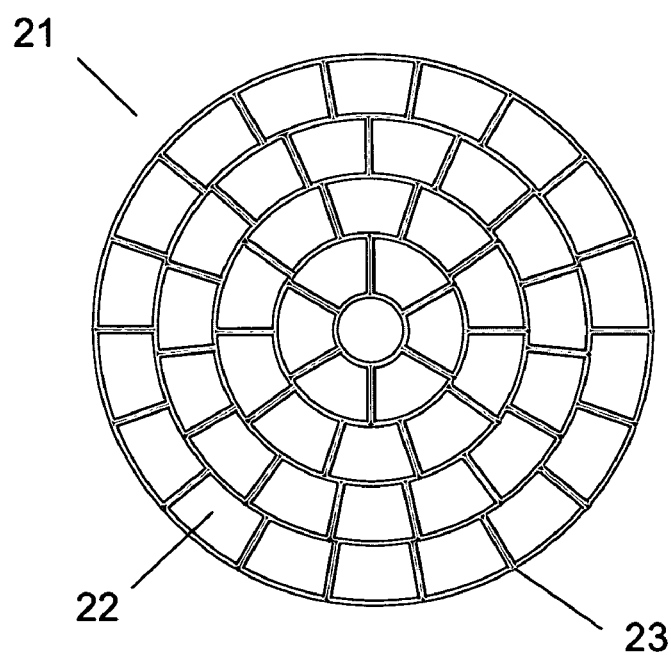
FIG. 2 is an in-plane schematic view showing one of the structures of the micromirror array lens that is made of many micromirrors and actuating components.

FIG. 2 illustrates the in-plane view of the micromirror array lens 21. The micromirror 22 has the same function as a mirror. Therefore, the reflective surface of the micromirror 22 is made of metal, metal compound, multi-layered dielectric material, or other materials with high reflectivity. Many known microfabrication processes can make the surface with high reflectivity. Each micromirror 22 is electrostatically and/or electromagnetically controlled by the actuating components 23 as known. In case of an axisymmetric lens, the micromirror array lens 21 has a polar array of the micromirrors 22. Each of the micromirrors 22 has a fan shape to increase an effective reflective area, which increases optical efficiency. The micromirrors are arranged to form one or more concentric circles to form the axisymmetric lens and the micromirrors on the same concentric circle can be controlled by the same electrodes or independently controlled by known semiconductor microelectronics technologies such as MOS or CMOS.

The mechanical structure upholding each reflective micromirror 22 and the actuating components 23 are located under the micromirrors 22 to increase the effective reflective area. Also, electric circuits to operate the micromirrors can be replaced with known semiconductor microelectronics technologies such as MOS and CMOS. Applying the microelectronics circuits under micromirror array, the effective reflective area can be increased by removing necessary area for electrode pads and wires used to supply actuating power.

Figure 3:
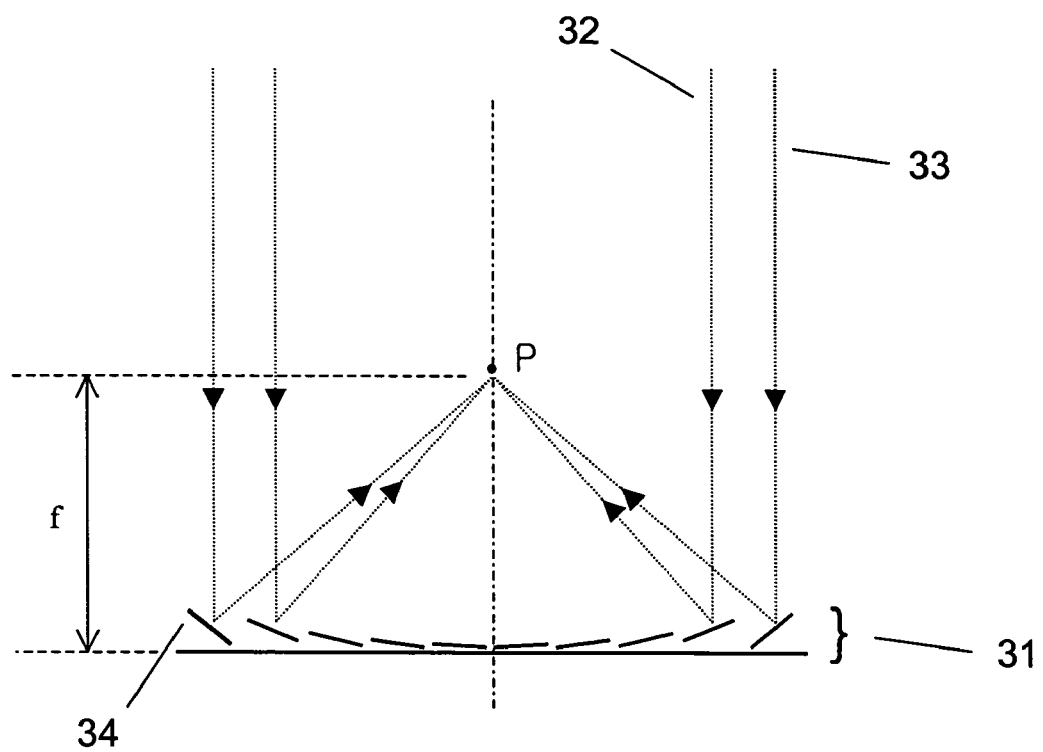
FIG. 3 is a schematic diagram showing how a micromirror array lens works as a lens.

FIG. 3 illustrates how the micromirror array lens 31 images. Arbitrary scattered lights 32, 33 are converged into one point P of the image plane by controlling the positions of the micromirrors 34. The phases of arbitrary light 32, 33 can be adjusted to be same by translating the micromirrors 34. The required translational displacement is at least half of the wavelength of light.

It is desired that each of the micromirrors 34 has a curvature because the ideal shape of a conventional reflective lens 12 has a curvature. If the size of the flat micromirror is small enough, the aberration of the lens comprising flat micromirrors 34 is also small enough. In this case, the micromirror does not need a curvature.

The focal length f of the micromirror array lens 31 is changed by controlling the rotation and the translation of each micromirror 34.

Figure 4:
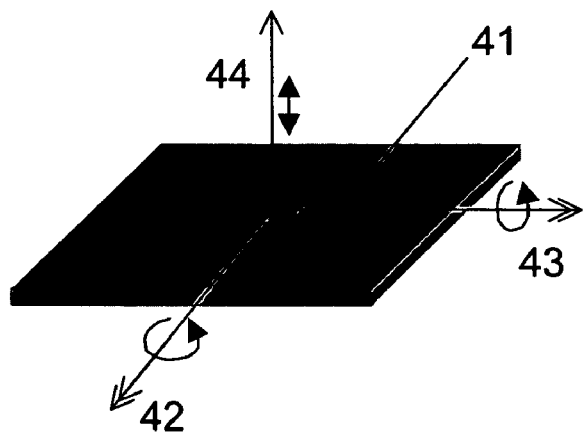
FIG. 4 is a schematic diagram showing two rotational axes and one translational axis of the micromirror.

FIG. 4 shows two degree of freedom rotations and one degree of freedom translation of the micromirror 41. The array comprising micromirrors 41 with two degree of freedom rotations 42, 43 and one degree of freedom translation 44, which are controlled independently can make a lens with arbitrary shape and/or size. Incident lights can be modulated arbitrarily by forming an arbitrary shape and/or size lens. To do this, it is required that incident lights are deflected to an arbitrary direction by controls of two degree of freedom rotations 42, 43. Independent translation 44 of each micromirror is also required to satisfy the phase condition.

Figure 5A:
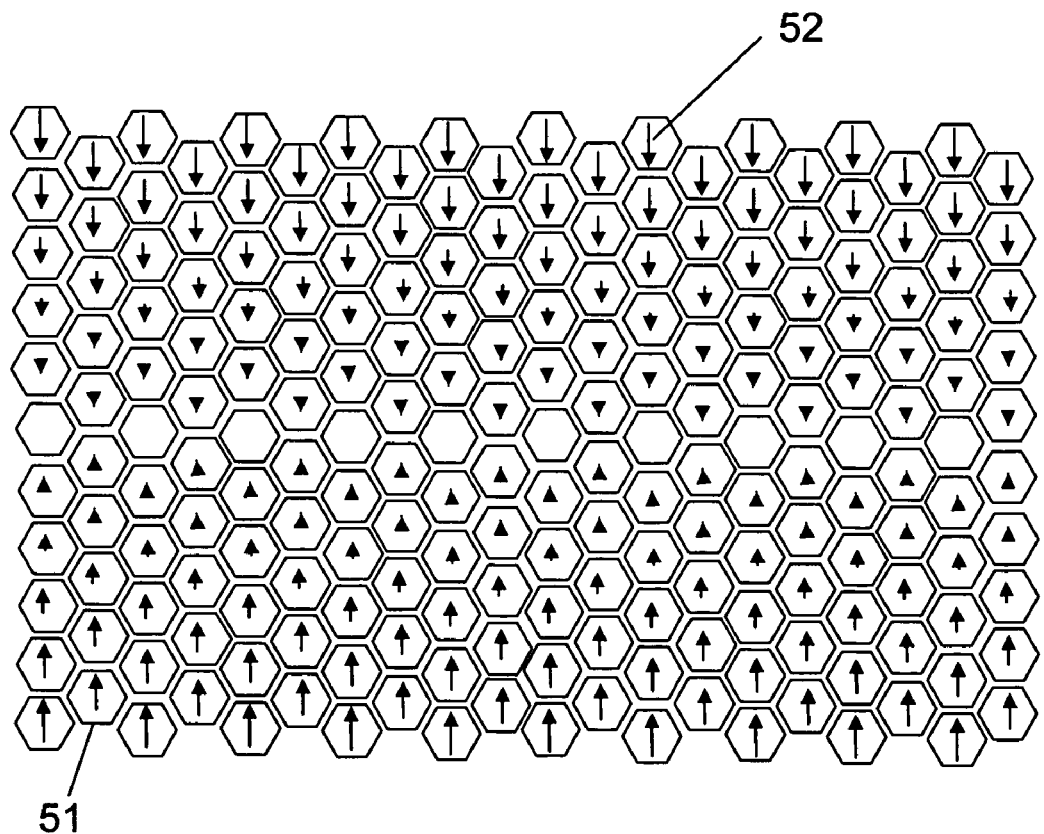
FIGS. 5a–5b are schematic diagrams showing the lenses comprising hexagonal micromirrors.
Figure 5B:
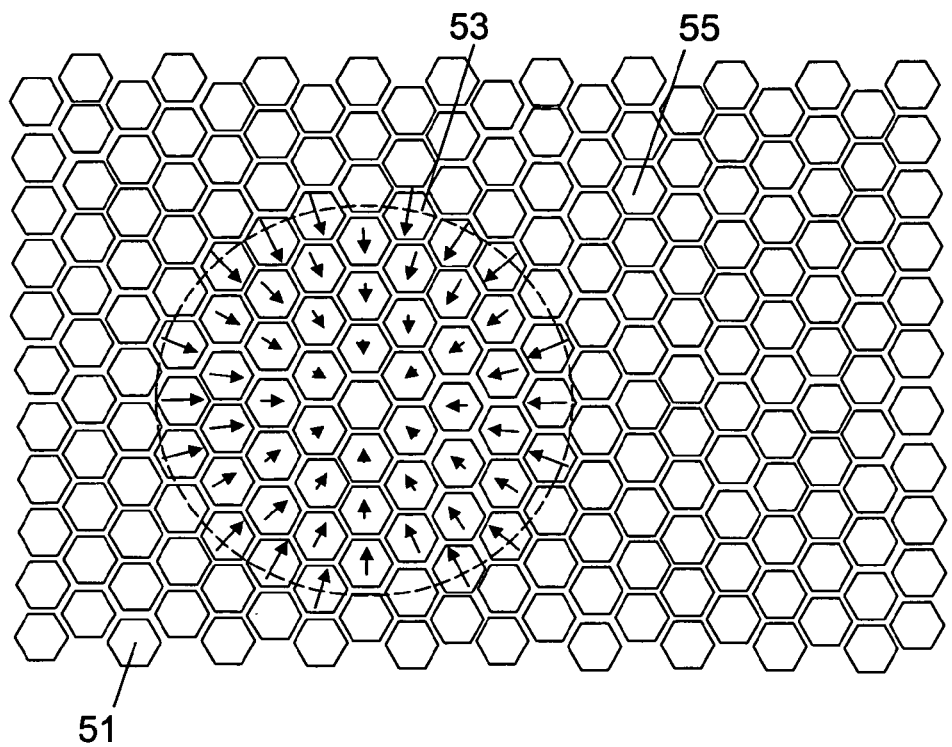
Figure 6:
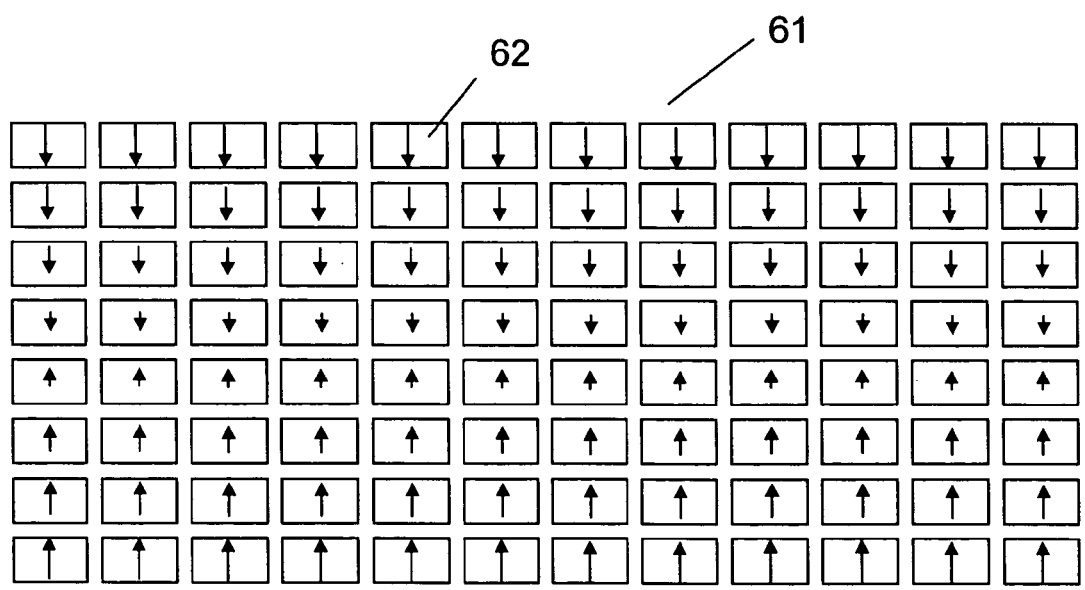
FIG. 6 is a schematic diagram showing the cylindrical lens comprising rectangular micromirrors.
Figure 7:
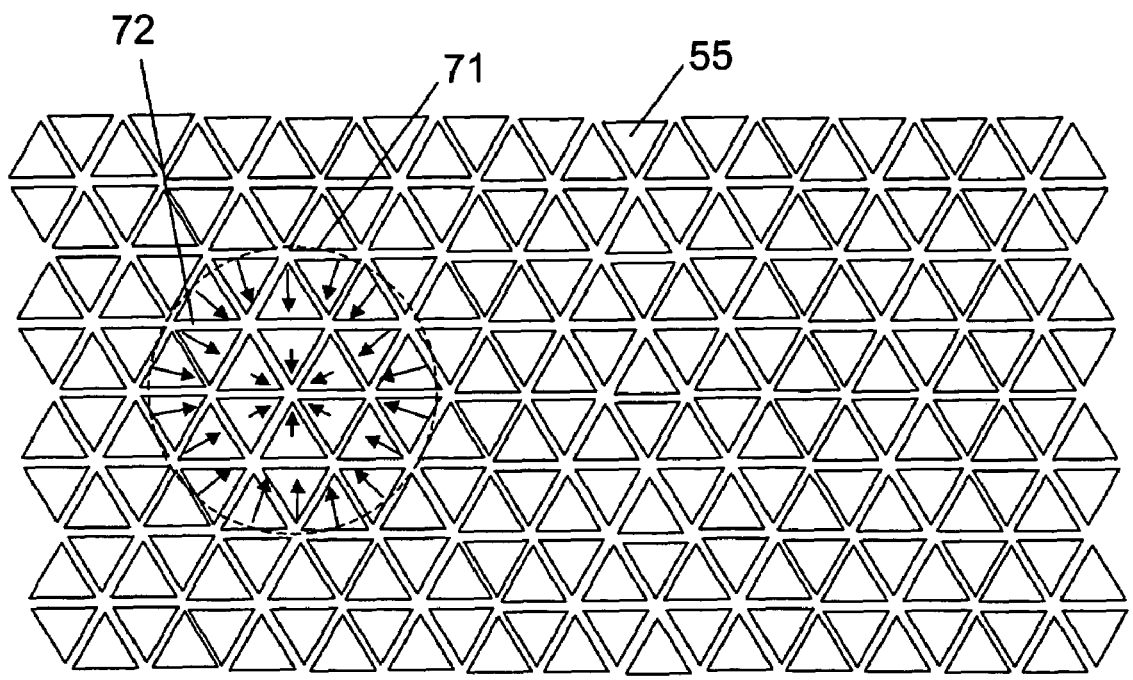
FIG. 7 is a schematic diagram showing the circular lens comprising triangular micromirrors.

In FIG. 5a, 5b, 6 and 7, the rotational amount of a micromirror is represented by length of arrow 52 and the profile gradient direction to represent a rotational direction of a micromirror is represented by direction of arrow 52. FIG. 5a shows a variable focal length cylindrical lens comprising hexagonal micromirrors 51. FIG. 5b shows a variable focal length circular lens 53 comprising hexagonal micromirrors 51. Shape, position and size of the variable focal length circular lens 53 can be changed by independent control of micromirrors 51 with two DOF rotations and one DOF translation. In FIGS. 5b and 7, micromirrors 55 which are not elements of the lens are controlled to make lights reflected by the micromirrors 55 not have influence on imaging or focusing.

Even though FIGS. 5a–5b show hexagonal micromirrors 51, fan shape, rectangle, square, and triangle micromirrors array can be used. An array comprising fan shape micromirrors is appropriate to an axisymmetric lens. FIG. 6 shows a variable focal length cylindrical lens 61 comprising rectangular micromirrors 62. An array comprising square or rectangle micromirrors 62 is appropriate to a symmetric lens about one in-plane axis such as cylindrical lens 61. The micromirrors with same rotation are controlled by the same electrode or controlled by known semiconductor microelectronics technologies such as MOS or CMOS independently.

FIG. 7 shows a variable focal length circular lens 71 comprising triangular micromirrors 72. An array comprising triangular micromirrors 72 is appropriate to a lens with arbitrary shape and/or size lens like an array comprising hexagonal micromirrors.

The micromirror array lens is an adaptive optical component because the phase of light can be changed by controlling the translations 44 and rotations 42, 43 of micromirrors independently. Adaptive optical micromirror array lens requires two-dimensional arrays of individually addressable micromirrors. To achieve this, it is necessary to combine the micromirrors with on-chip electronics. In order to do this, wafer-level integration of micromirrors with the known microelectronics circuits is necessary.

The micromirror array lens can correct the phase errors since an adaptive optical component can correct the phase errors of light due to the medium between the object and its image, and/or correct the defects of a lens system that cause its image to deviate from the rules of paraxial imagery. For example, the micromirror array lens can correct the phase error due to optical tilt by adjusting the translations 44 and rotations 42, 43 of micromirrors.

The same phase condition satisfied by the micromirror array lens contains an assumption of monochromatic light. Therefore, to get a color image, the micromirror array lens is controlled to satisfy the same phase condition for each wavelength of Red, Green, and Blue (RGB), respectively, and the imaging system can use bandpass filters to make monochromatic lights with wavelengths of Red, Green, and Blue (RGB).

If a color photoelectric sensor is used as an imaging sensor in the imaging system using a micromirror array lens, a color image can be obtained by processing electrical signals from Red, Green, and Blue (RGB) imaging sensors with or without bandpass filters, which should be synchronized with the control of micromirror array lens. To image Red light scattered from an object, the micromirror array lens is controlled to satisfy the phase condition for Red light. During the operation, Red, Green, and Blue imaging sensors measure the intensity of each Red, Green, and Blue light scattered from an object. Among them, only the intensity of Red light is stored as image data because only Red light is imaged properly. To image each Green or Blue light, the micromirror array lens and each imaging sensor works in the same manner as the process for the Red light. Therefore, the micromirror array lens is synchronized with Red, Green, and Blue imaging sensors. Alternatively, the same phase condition for a color image is satisfied by using the least common multiple of wavelengths of Red, Green, and Blue lights as an effective wavelength for the phase condition. In this case, the micromirror array lens is not necessary to be controlled to satisfy the phase condition for each Red, Green, and Blue light individually. Instead, the phase condition for the least common multiple of the wavelengths should be satisfied.

For the simpler control, the translation of each micromirror is only controlled to satisfy the phase condition for one light among Red, Green, and Blue lights or is not controlled to satisfy the phase condition for any other lights of Red, Green, and Blue. Even though the micromirror array lens cannot satisfy the phase condition due to phase error of lights with multi-wavelength, still the lens can be used as a variable focal length lens with low quality.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A variable focal length lens comprising a plurality of micromirrors with two degrees of freedom rotation and one degree of freedom translation, wherein the two degrees of freedom rotation and one degree of freedom translation of the micromirrors are controlled to change the focal length of the lens and to satisfy the same phase conditions for the lights, wherein the lens is a diffractive Fresnel lens.

2. The lens of claim 1, wherein all of the micromirrors are arranged in a flat plane.

3. The lens of claim 1, wherein the micromirrors are arranged to form one or more concentric circles to form the lens.

4. The lens of claim 3, wherein the micromirrors on each of the concentric circles are controlled by one or more electrodes corresponding to the concentric circle.

5. The lens of claim 1, wherein the micromirrors with same displacements are controlled by the same electrodes.

6. The lens of claim 1, wherein the micromirror has a fan shape.

7. The lens of claim 1, wherein the micromirror have a hexagonal shape.

8. The lens of claim 1, wherein the micromirror has a rectangular shape.

9. The lens of claim 1, wherein the micromirror has a square shape.

10. The lens of claim 1, wherein the micromirror has a triangle shape.

11. The lens of claim 1, wherein the reflective surface of the micromirror is substantially flat.

12. The lens of claim 1, wherein a control circuitry is constructed under the micromirrors by using semiconductor microelectronics technologies.

13. The lens of claim 1, wherein the micromirrors are actuated by electrostatic force.

14. The lens of claim 1, wherein the micromirrors are actuated by electromagnetic force.

15. The lens of claim 1, wherein the micromirrors are actuated by electrostatic force and electromagnetic force.

16. The lens of claim 1, wherein a mechanical structure upholding the micromirrors and actuating components are located under the micromirrors.

17. The lens of claim 1, wherein the micromirrors are controlled independently.

18. The lens of claim 1, wherein the reflective surface of the micromirror has a curvature.

19. The lens of claim 18, wherein curvatures of the micromirrors are controlled.

20. The lens of claim 19, wherein the curvatures of the micromirrors are controlled by electrothermal force.

21. The lens of claim 19, wherein the curvatures of the micromirrors are controlled by electrostatic force.

22. The lens of claim 1, wherein the surface material of the micromirror is the one with high reflectivity.

23. The lens of claim 1, wherein the surface material of the micromirror is metal.

24. The lens of claim 1, wherein the surface material of the micromirror is metal compound.

25. The lens of claim 1, wherein the surface of the micromirror is made of multi-layered dielectric material.

26. The lens of claim 1, wherein the lens is an adaptive optical component, wherein the lens compensates for phase errors of light due to the medium between an object and its image.

27. The lens of claim 1, wherein the lens is an adaptive optical component, wherein the lens corrects aberrations.

28. The lens of claim 1, wherein the lens is an adaptive optical component, wherein the lens corrects the defects of an imaging system that cause the image to deviate from the rules of paraxial imagery.

29. The lens of claim 1, wherein the lens is an adaptive optical component, wherein an object which does not lie on the optical axis can be imaged by the lens without macroscopic mechanical movement.

30. The lens of claim 1, wherein the lens is controlled to satisfy the same phase condition for each wavelength of Red, Green, and Blue (RGB), respectively, to get a color image.

31. The lens of claim 1, wherein the lens is controlled to satisfy the same phase condition for one wavelength among Red, Green, and Blue (RGB) to get a color image.

32. The lens of claim 1, wherein the same phase condition for color imaging is satisfied by using the least common multiple of wavelengths of Red, Green, and Blue lights as an effective wavelength for the phase condition.

33. The lens of claim 1, wherein the lens is not controlled to satisfy the same phase condition for any wavelength among Red, Green, and Blue (RGB) to get a color image.

* * * * *